United States Patent
Choi et al.

(10) Patent No.: US 7,633,740 B2
(45) Date of Patent: Dec. 15, 2009

(54) SOLID ELECTROLYTIC CAPACITOR AND METHOD OF MANUFACTURING THE SAME

(75) Inventors: Hee Sung Choi, Gyeonggi-do (KR); Seoung Jae Lee, Gyeonggi-do (KR); Yeoung Jin Lee, Gyeonggi-do (KR); Sung Han Won, Seoul (KR); Ha Yong Jung, Gyeonggi-do (KR); Hyun Ho Shin, Gyeonggi-do (KR); Jung Tae Park, Seoul (KR); Jae Youn Jeong, Gyeonggi-do (KR)

(73) Assignee: Samsung Electro-Mechanics Co. Ltd., Gyunggi-Do (KR)

( * ) Notice: Subject to any disclaimer, the term of this patent is extended or adjusted under 35 U.S.C. 154(b) by 151 days.

(21) Appl. No.: 12/007,190

(22) Filed: Jan. 8, 2008

(65) Prior Publication Data

US 2009/0154065 A1 Jun. 18, 2009

(30) Foreign Application Priority Data

Dec. 17, 2007 (KR) .................. 10-2007-0132562

(51) Int. Cl.
*H01G 4/228* (2006.01)
*H01G 9/10* (2006.01)

(52) U.S. Cl. ............... 361/540; 361/538; 361/532; 29/25.03

(58) Field of Classification Search ........... 361/540, 361/535–538, 532–533, 528
See application file for complete search history.

(56) References Cited

U.S. PATENT DOCUMENTS

| 4,017,773 | A | * | 4/1977 | Cheseldine | ............... | 361/532 |
|---|---|---|---|---|---|---|
| 4,571,664 | A | * | 2/1986 | Hyland | ............... | 361/540 |
| 5,349,496 | A | * | 9/1994 | Taniguchi et al. | ............... | 361/528 |
| 5,559,668 | A | * | 9/1996 | Kuriyama | ............... | 361/533 |
| 5,586,000 | A | * | 12/1996 | Sakata et al. | ............... | 361/525 |
| 5,638,253 | A | * | 6/1997 | Hasegawa | ............... | 361/535 |
| 5,781,401 | A | * | 7/1998 | Tomiyasu et al. | ............... | 361/303 |
| 2006/0262489 | A1 | | 11/2006 | Vaisman et al. | | |

FOREIGN PATENT DOCUMENTS

JP 2000-348975 12/2000
KR 10-2002-0026673 4/2002

* cited by examiner

*Primary Examiner*—Eric Thomas
(74) *Attorney, Agent, or Firm*—McDermott Will & Emery LLP

(57) ABSTRACT

Provided is a solid electrolytic capacitor including a capacitor element with a positive polarity; an anode wire of which one end is inserted into the capacitor element and the other end projects outward from the capacitor element; a cathode extraction layer formed on the capacitor element; a plurality of conductive bumps formed on the cathode extraction layer; a molding portion formed to surround the capacitor element and exposing the projecting end of the anode wire and ends of the conductive bumps; an anode lead terminal provided on the molding portion so as to be electrically connected to the exposed end of the anode wire; and a cathode lead terminal provided on the molding portion so as to be electrically connected to the exposed ends of the conductive bumps.

23 Claims, 6 Drawing Sheets

[FIG. 1]
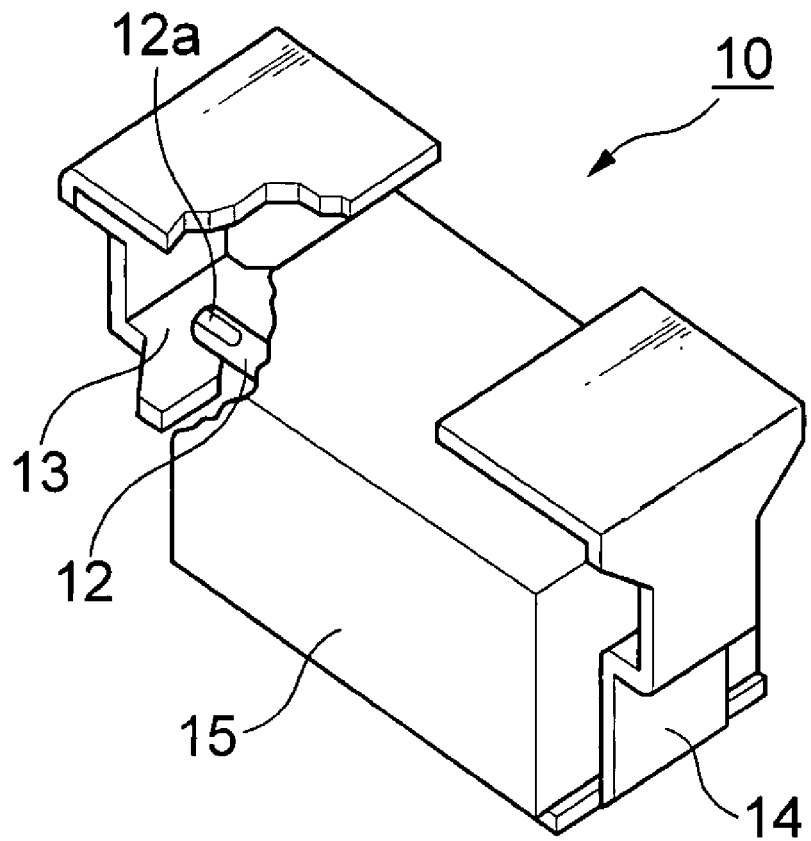
[FIG. 2]
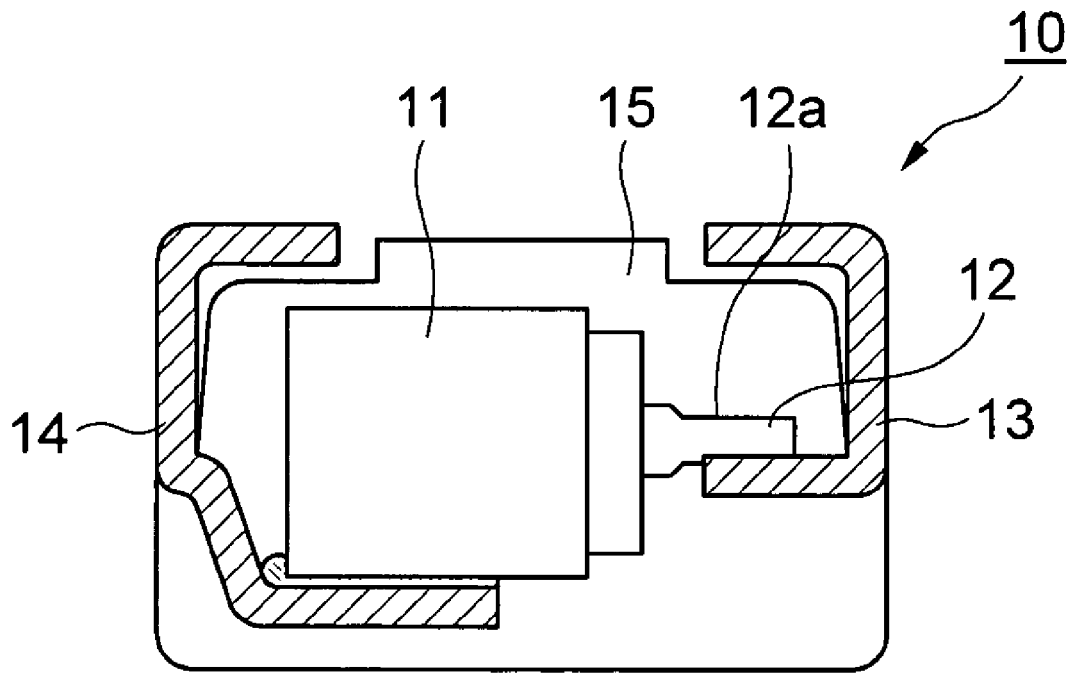

[FIG. 3]
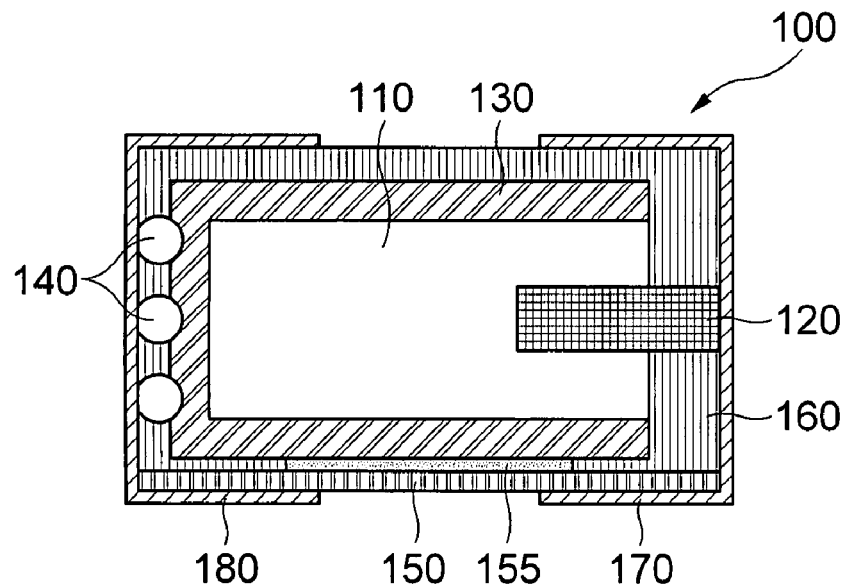
[FIG. 4]
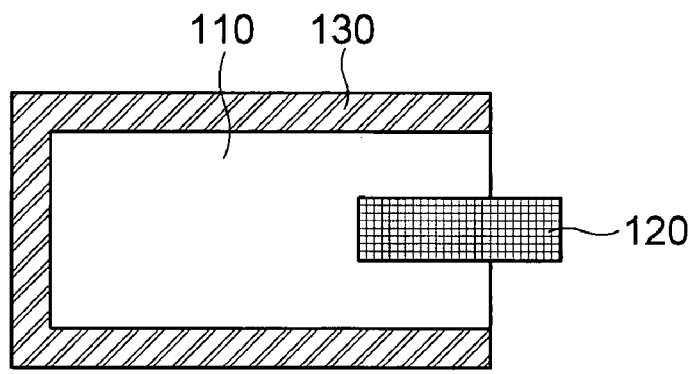
[FIG. 5]
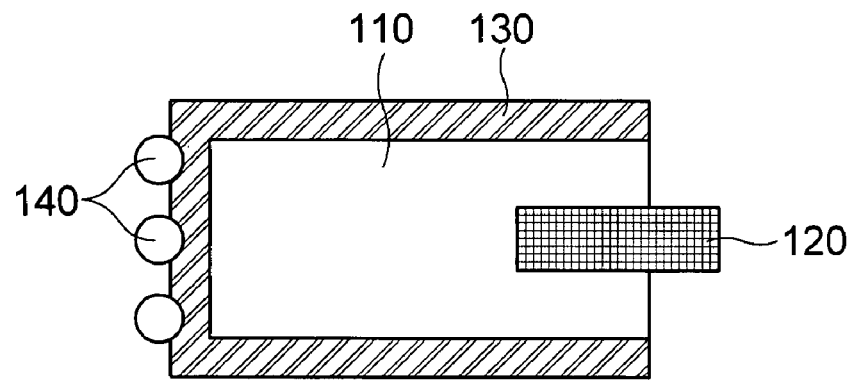
[FIG. 6]
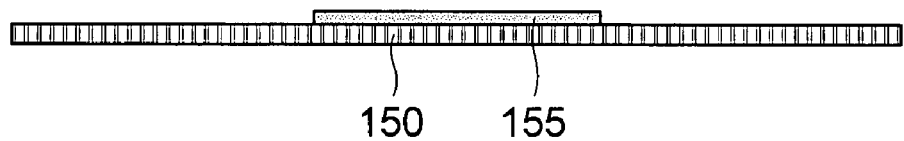

[FIG. 7]
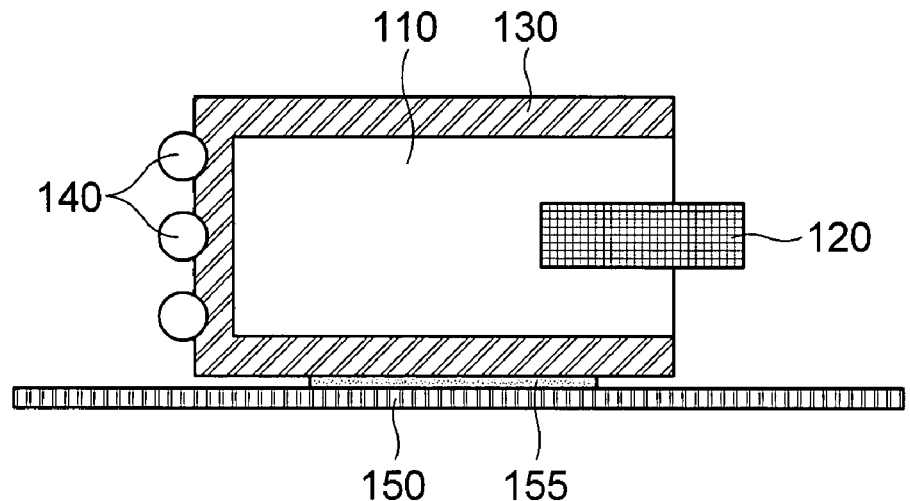
[FIG. 8]
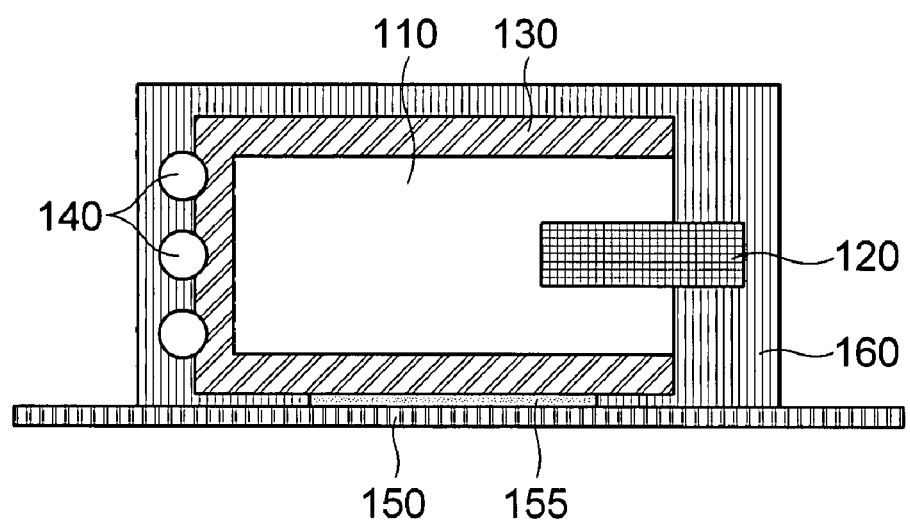
[FIG. 9]
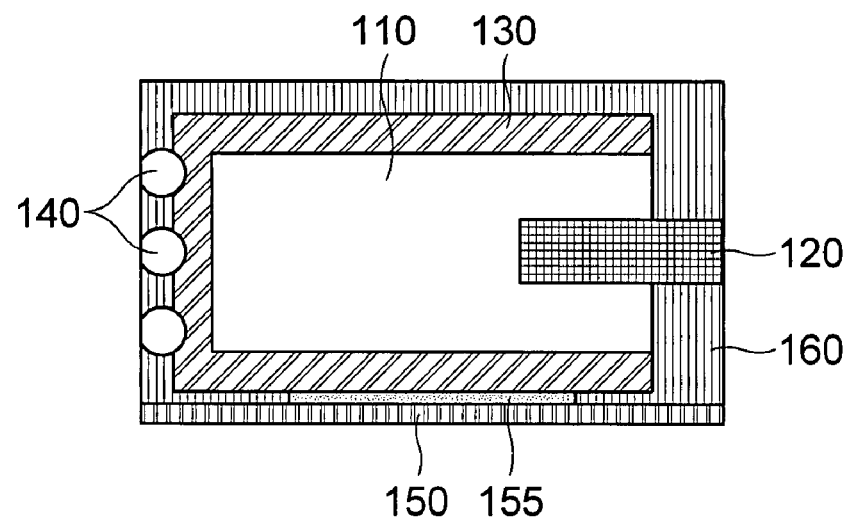

[FIG. 10]
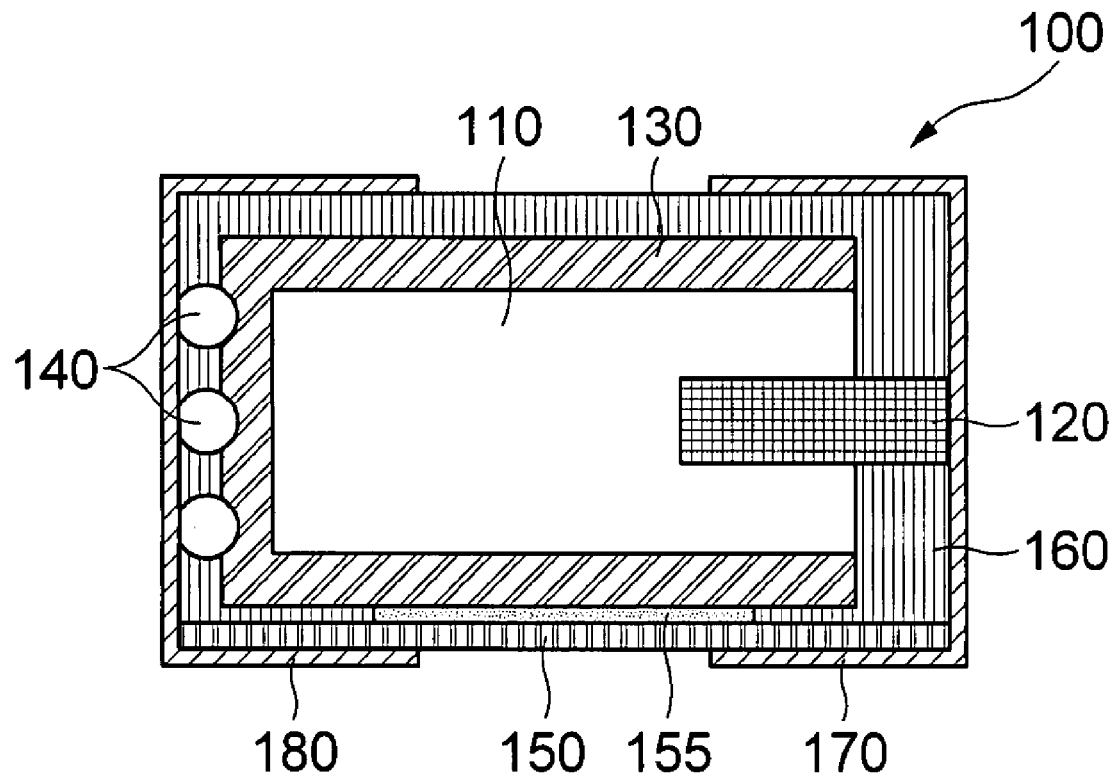
[FIG. 11]
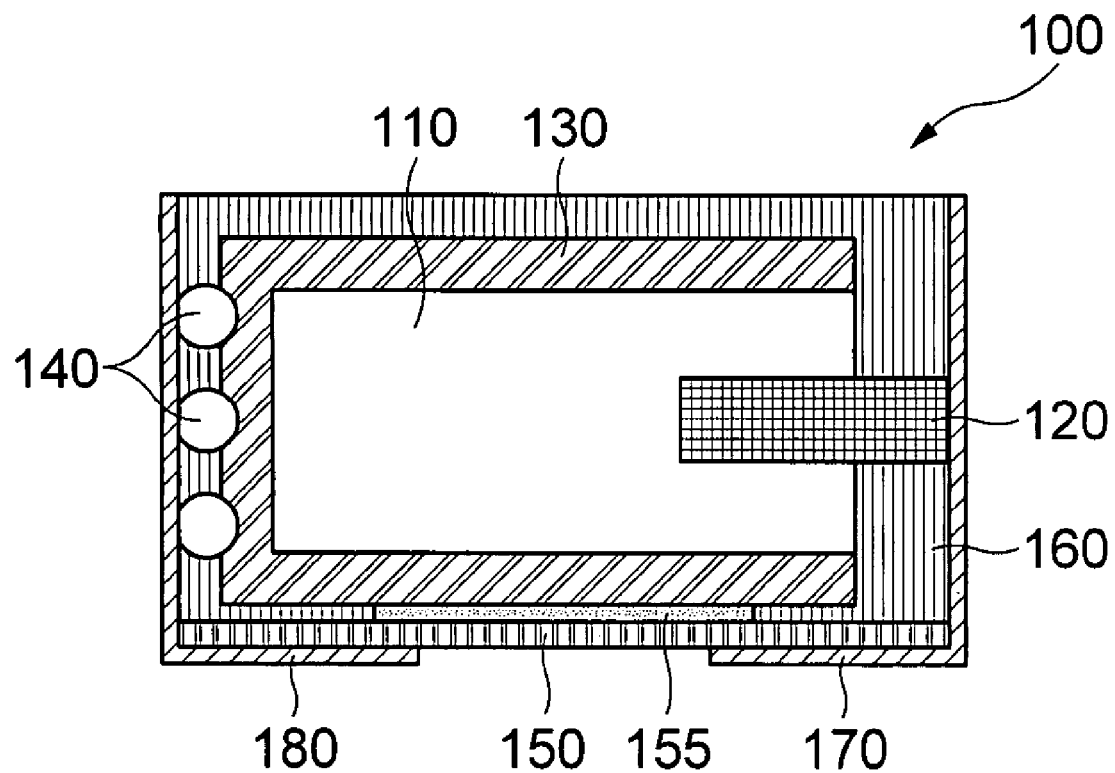

[FIG. 12]
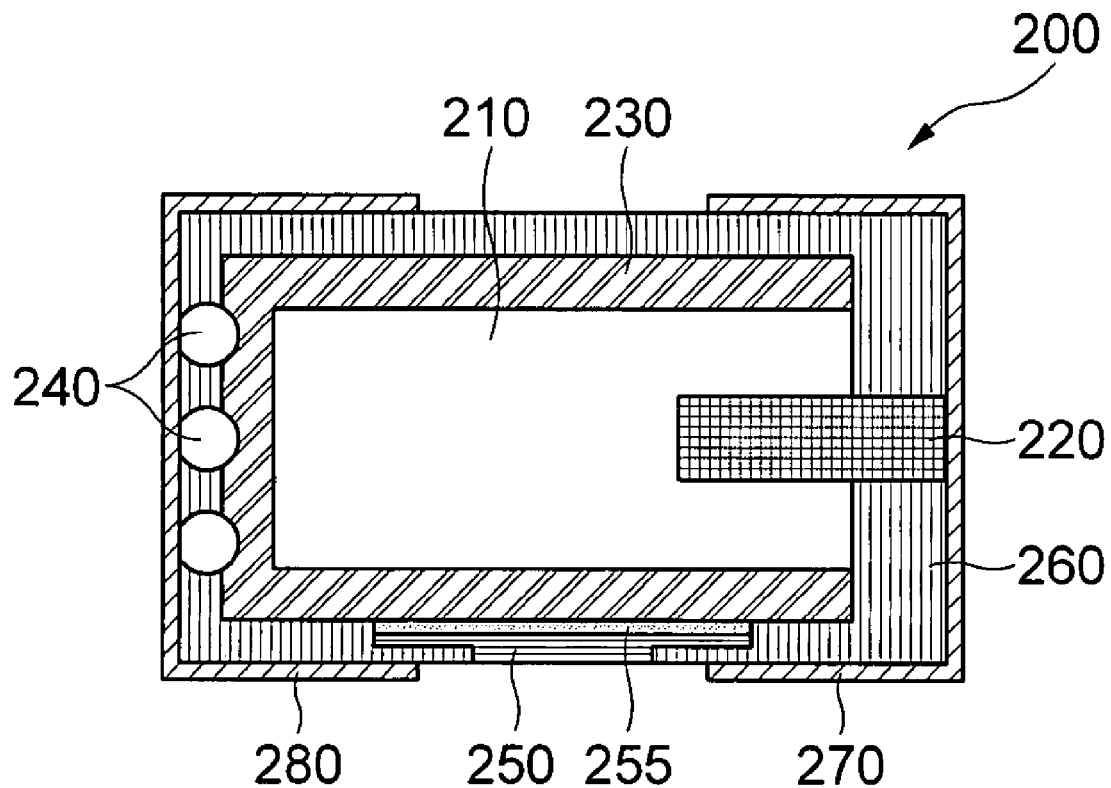
[FIG. 13]
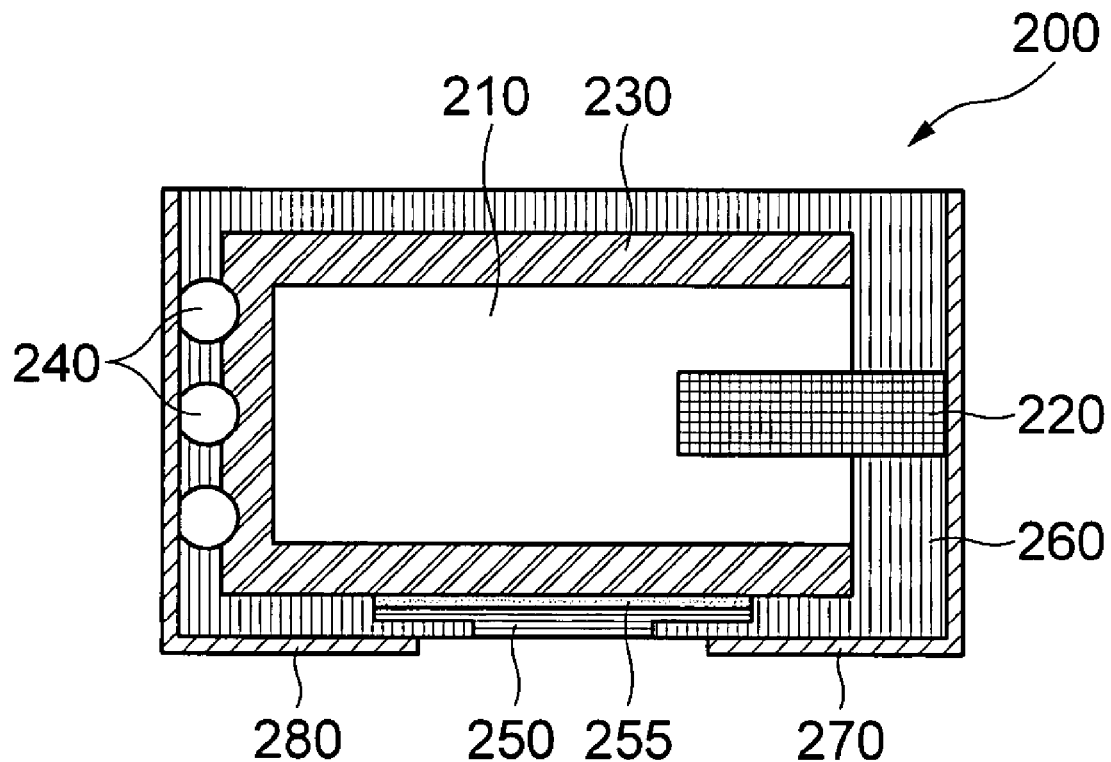

[FIG. 14]
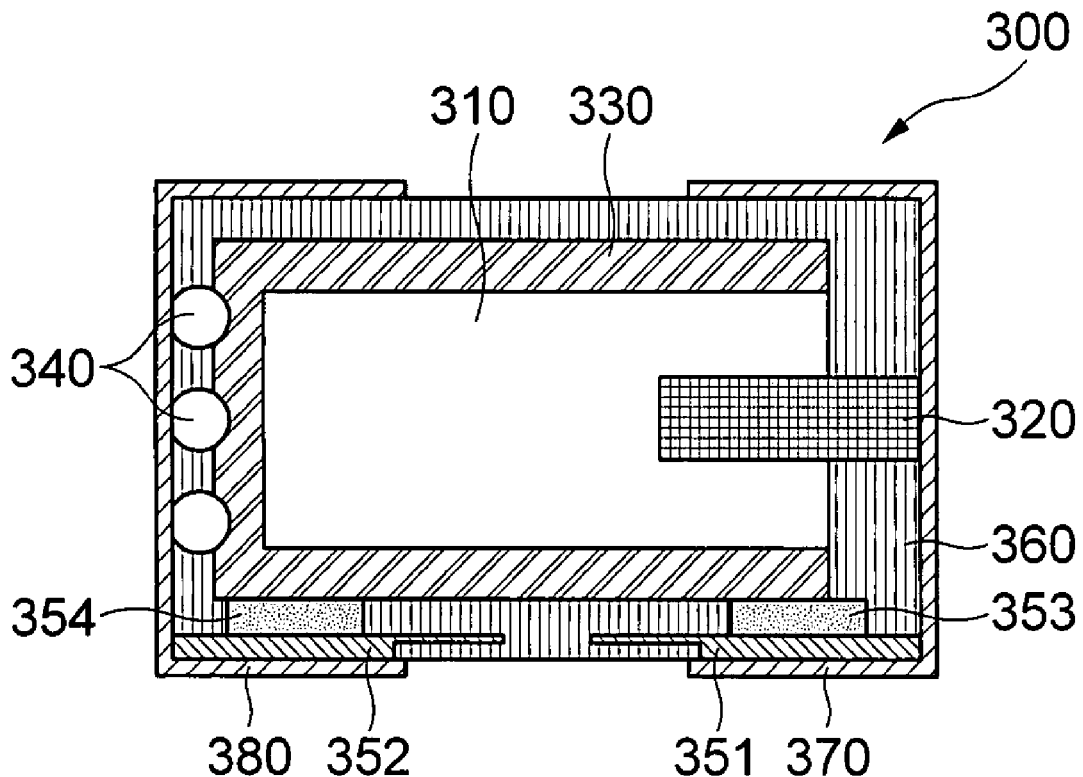
[FIG. 15]
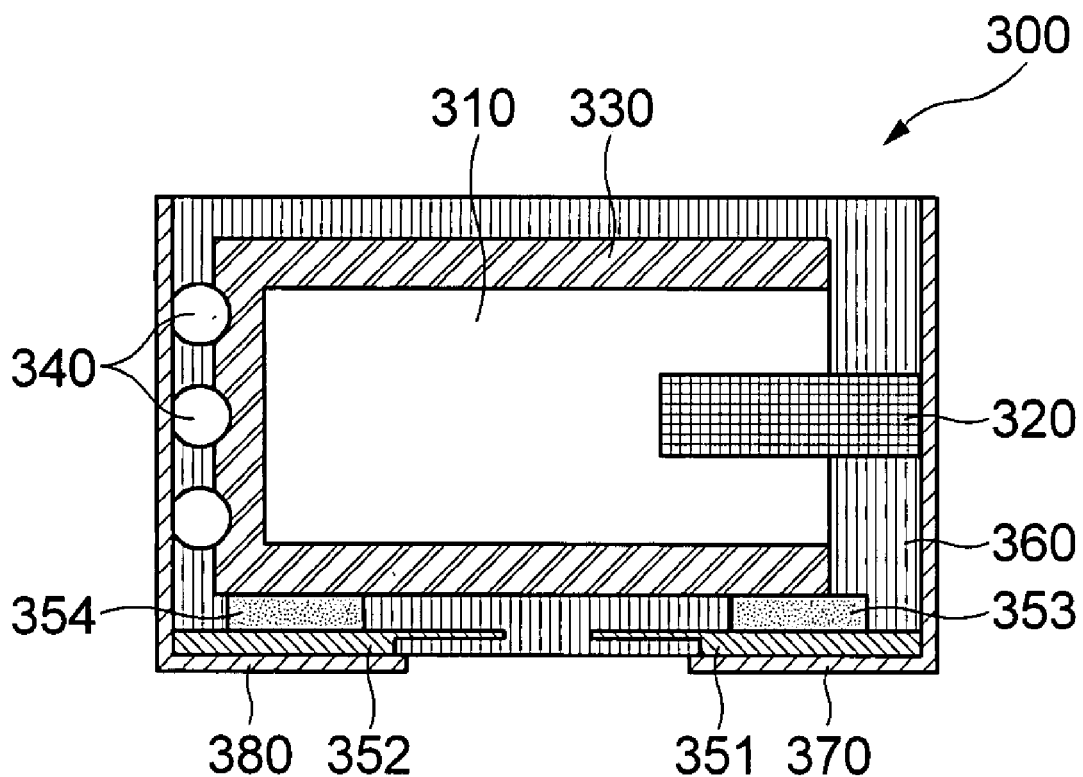

SOLID ELECTROLYTIC CAPACITOR AND METHOD OF MANUFACTURING THE SAME

CROSS-REFERENCE TO RELATED APPLICATIONS

This application claims the benefit of Korean Patent Application No. 10-2007-0132562 filed with the Korea Intellectual Property Office on Dec. 17, 2007, the disclosure of which is incorporated herein by reference.

BACKGROUND OF THE INVENTION

1. Field of the Invention

The present invention relates to a solid electrolytic capacitor and a method of manufacturing the same.

2. Description of the Related Art

In general, solid electrolytic capacitors having a function of storing electricity are electronic components used for blocking direct currents and passing alternating currents. Among the solid electrolytic capacitors, the most representative one is a tantalum capacitor which is used in application circuits, of which the rate voltage range is low, as well as general industrial equipments. In particular, the tantalum capacitor is frequently used in circuits requiring an excellent frequency characteristic or for reducing noise of communication equipments.

FIG. 1 is a perspective view of a conventional solid electrolytic capacitor, and FIG. 2 is a cross-sectional view of the conventional solid electrolytic capacitor. As shown in FIGS. 1 and 2, the solid electrolytic capacitor 10 includes a capacitor element 11 which determines the capacity and characteristic of the capacitor and is formed of dielectric ceramic powder, anode and cathode lead frames 13 and 14 which are connected to the capacitor element 11 so as to be easily mounted on a printed circuit board (PCB), and an epoxy case 15 which is molded of epoxy so as to protect the capacitor element 11 from the external environment and to form the shape of the capacitor element.

In one side of the capacitor element 11, a rod-shaped anode wire 12 is formed to project with a predetermined length.

The anode wire 12 has a planar surface 12a provided thereon, the pressed surface 12a increasing a contact area with the anode lead frame 13 and preventing the anode lead frame 12 from rocking from side to side during welding.

The capacitor element 11 is manufactured by the following process. First, dielectric ceramic powder is molded in a rectangular parallelepiped shape in a pressing process and is then sintered. Further, a dielectric oxide film is formed on the surface of the sintered body. Then, the body is dipped into a manganese nitrate solution such that a manganese dioxide layer composed of a solid electrolyte is formed on the outer surface of the body.

A process of connecting the anode and cathode lead frames 13 and 14 to the capacitor element 11 manufactured in such a manner includes two steps. In the first step, the plate-shaped anode lead frame 13 is welded on the planar surface 12a of the rod-shaped anode wire 12, which projects from one side surface of the capacitor element 11 at a predetermined length, so as to derive an anode terminal. In the second step, a cathode terminal is derived through the surface of the capacitor element 11 or a conductive adhesive coated on the cathode lead frame 14.

Then, the capacitor element 11 is electrically connected to the anode and cathode lead frames 13 and 14, respectively, and the epoxy case 15 is molded of epoxy. Then, the solid electrolytic capacitor is completed through a subsequent assembling process.

The above-described conventional electrolytic capacitor has the following problems.

While the anode wire 12 and the anode lead frame 13 are directly welded, high-temperature heat is generated. The generated heat has an effect upon the capacitor element 11 through the anode wire 12, thereby damaging the capacitor element 11 which is vulnerable to heat.

Further, dielectrics are destroyed by the heat shock applied to the capacitor element 11 such that a product quality is degraded and defects occur. Therefore, a manufacturing cost increases.

Further, the anode lead frame 13 and the cathode lead frame 14 occupy such a large space in the epoxy case 15. Therefore, the capacitor element 11 is inevitably reduced in size within the epoxy case 15. As a result, the capacitance of the capacitor decreases.

SUMMARY OF THE INVENTION

An advantage of the present invention is that it provides a solid electrolytic capacitor and a method of manufacturing the same, which can reduce a manufacturing cost by simplifying a structure and a manufacturing process, can achieve a reduction in size, can maximize capacitance, and can implement a low ESR (Equivalent Series Resistance) characteristic.

Additional aspects and advantages of the present general inventive concept will be set forth in part in the description which follows and, in part, will be obvious from the description, or may be learned by practice of the general inventive concept.

According to an aspect of the invention, a solid electrolytic capacitor comprises a capacitor element with a positive polarity; an anode wire of which one end is inserted into the capacitor element and the other end projects outward from the capacitor element; a cathode extraction layer formed on the capacitor element; a plurality of conductive bumps formed on the cathode extraction layer; a molding portion formed to surround the capacitor element and exposing the projecting end of the anode wire and ends of the conductive bumps; an anode lead terminal provided on the molding portion so as to be electrically connected to the exposed end of the anode wire; and a cathode lead terminal provided on the molding portion so as to be electrically connected to the exposed ends of the conductive bumps.

The solid electrolytic capacitor may further include a support frame provided under the capacitor element and supporting the capacitor element.

Preferably, the support frame is bonded under the capacitor element through an adhesive.

The cathode extraction layer may be composed of a dielectric oxide coating film, a solid-state electrolyte layer, and a cathode reinforcing layer, which are sequentially formed on the capacitor element.

The conductive bumps may be formed of metal such as silver (Ag), copper (Cu), zinc (Zn), or tin (Sn), and are provided in the form of dots dispensed on the surface of the cathode extraction layer.

Alternately, the conductive bumps may be formed of ink or paste including metal such as Ag, Cu, Zn, or Sn, and may be provided on the surface of the cathode extraction layer through an inkjet method.

The anode lead terminal and the cathode lead terminal may be formed of a plated layer obtained by an electroless plating method.

Preferably, the plated layer is composed of an inner plated layer obtained through electroless Ni/P plating and an outer plated layer obtained by plating the inner plated layer with Cu or Sn.

According to another aspect of the invention, a method of manufacturing a solid electrolytic capacitor comprises the steps of: (a) forming a capacitor element with a positive polarity; (b) inserting and connecting an anode wire to one side of the capacitor element; (c) forming a cathode extraction layer on the capacitor element; (d) forming a plurality of conductive bumps on the cathode extraction layer; (e) fixing the capacitor element to a support frame; (f) forming a molding portion to surround the capacitor element; (g) exposing a projecting end of the anode wire and ends of the conductive bumps; and (h) forming an anode lead terminal which is electrically connected to the exposed end of the anode wire and a cathode lead terminal which is electrically connected to the exposed ends of the conductive bumps.

In step (c), the cathode extraction layer may be constructed by sequentially forming a dielectric oxide coating film, a solid-state electrolyte layer, and a cathode reinforcing layer on the capacitor element.

Step (d) may be performed after step (e).

In step (d), the conductive bumps may be formed of metal such as Ag, Cu, Zn, or Sn, and are provided in the form of dots dispensed on the surface of the cathode extraction layer.

In step (d), the conductive bumps may be formed of ink or paste including metal such as Ag, Cu, Zn, or Sn, and are provided on the surface of the cathode extraction layer through an inkjet method.

The method may further include the step of cutting the projecting end of the anode wire such that the projecting end of the anode wire is adjacent to the surface of the capacitor element. The cutting of the projecting end is performed after step (b).

The method may further include coating the surface of the anode wire with an insulating material. The coating of the surface of the anode wire is performed before the cutting of the projecting end.

Preferably, the projecting end of the anode wire is cut by ultraviolet (UV) laser.

In step (e), the capacitor element may be fixed to the support frame through an adhesive.

In step (f), the molding portion may be formed to seal the projecting end of the anode wire and the conductive bumps.

The molding portion may be formed of epoxy-based resin.

In step (g), the molding portion may be diced in such a manner that the projecting end of the anode wire and the ends of the conductive bumps are exposed.

Preferably, the diced portion is subjected to grinding, polishing, or sand blasting.

In step (h), the anode lead terminal and the cathode lead terminal may be plated layers formed by an electroless plating method.

Preferably, the plated layer is composed of an inner plated layer obtained through electroless Ni/P plating and an outer plated layer obtained by plating the inner plated layer with Cu or Sn.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view of a conventional solid electrolytic capacitor;

FIG. 2 is a cross-sectional view of the conventional solid electrolytic capacitor;

FIG. 3 is a front cross-sectional view of the solid electrolytic capacitor according to a first embodiment of the invention;

FIGS. 4 to 10 are cross-sectional views sequentially showing a method of manufacturing a solid electrolytic capacitor according to the first embodiment of the invention;

FIG. 11 is a cross-sectional view of a solid electrolytic capacitor according to a modification of the first embodiment of the invention;

FIG. 12 is a front cross-sectional view of a solid electrolytic capacitor according to a second embodiment of the invention;

FIG. 13 is a cross-sectional view of a solid electrolytic capacitor according to a modification of the second embodiment of the invention;

FIG. 14 is a front cross-sectional view of a solid electrolytic capacitor according to a third embodiment of the invention; and FIG. 15 is a cross-sectional view of a solid electrolytic capacitor according to a modification of the third embodiment.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a solid electrolytic capacitor and a method of manufacturing the same according to the present invention will be described in detail with reference to the accompanying drawings.

First Embodiment of Solid Electrolytic Capacitor

Referring to FIG. 3, a solid electrolytic capacitor according to a first embodiment of the invention will be described in detail.

FIG. 3 is a front cross-sectional view of the solid electrolytic capacitor according to the first embodiment of the invention.

As shown in FIG. 3, the solid electrolytic capacitor 100 according to the first embodiment of the invention includes a capacitor element 110 with a positive polarity, an anode wire 120 of which one side is inserted into the capacitor element 110 and the other side projects outward from the capacitor element 110, a cathode extraction layer 130 formed on the capacitor element 110, a plurality of conductive bumps 140 formed on the cathode extraction layer 130, a support frame 150 which is provided under the capacitor element 110 and supports the capacitor element 110, a molding portion 160 which is formed to surround the capacitor element 110 and exposes the projecting end of the anode wire 120 and ends of the conductive bumps 140, an anode lead terminal 170 which is provided on the molding portion 160 so as to be electrically connected to the exposed end of the anode wire 120, and a cathode lead terminal 180 which is provided on the molding portion 160 so as to be electrically connected to the exposed ends of the conductive bumps 140.

The cathode extraction layer 130 is composed of a dielectric oxide coating film, a solid-state electrolyte layer, and a cathode reinforcing layer, which are sequentially formed on the capacitor element 110, and has a negative polarity.

In this case, it is preferable that the cathode extraction layer 130 is formed on the surface of the capacitor element 110 excluding the surface where the anode wire 120 is formed, in order to prevent the anode wire 120 and the cathode extraction layer 130 from being electrically connected to each other.

Alternately, the projecting surface of the anode wire 120 may be insulated from the cathode extraction layer 130 by insulation coating or the like.

The conductive bumps 140, which serve as a medium for electrically connecting the cathode lead terminal 180 to the cathode extraction layer 130, are formed of metal selected from silver (Ag), copper (Cu), zinc (Zn), and tin (Sn). The conductive bumps 140 may be provided in the form of dots dispensed on the surface of the cathode extraction layer 130 opposed to the anode wire 120.

The conductive bumps 140 may be formed of ink or paste including metal selected from Ag, Cu, Zn, and Sn and may be provided on the surface of the cathode extraction layer 130 opposed to the anode wire 120 through an inkjet method.

Preferably, the support frame 150 is bonded under the capacitor element 110 through an adhesive 155.

The anode lead terminal 170 and the cathode lead terminal 180 are formed to extend to both sides of the bottom surface of the support frame 150, respectively.

Therefore, to prevent the anode lead terminal 170 and the cathode extraction layer 130 from being electrically connected through the support frame 150, the support frame 150 may be formed of an insulating material or the adhesive 155 for bonding the capacitor element 110 to the support frame 150 may be formed of an insulating adhesive.

The anode lead terminal 170 and the cathode lead terminal 180 may be formed of a plated layer obtained through an electroless plating method.

Preferably, the plated layer is composed of an inner plated layer obtained through electroless Ni/P plating and an outer plated layer obtained by plating the inner plated layer with Cu or Sn.

Hereinafter, a method of manufacturing a solid electrolytic capacitor according to the first embodiment of the invention will be described in detail with reference to FIGS. 4 to 10.

FIGS. 4 to 10 are cross-sectional views sequentially showing a method of manufacturing a solid electrolytic capacitor according to the first embodiment of the invention. FIG. 4 is a cross-sectional view of a capacitor element having an anode wire and a cathode extraction layer formed therein. FIG. 5 is a cross-sectional view of the capacitor element showing a state where conductive bumps are formed. FIG. 6 is a cross-sectional view of a support frame. FIG. 7 is a cross-sectional view showing a state where the capacitor element of FIG. 5 is bonded to the support frame of FIG. 6. FIG. 8 is a cross-sectional view showing a state where a molding portion is formed. FIG. 9 is a cross-sectional view showing a state where the molding portion is diced. FIG. 10 is a cross-sectional view showing a state where an anode lead terminal and a cathode lead terminal are formed.

The method of manufacturing a solid electrolytic capacitor according to the first embodiment of the invention includes the steps of: forming a capacitor element 110 with a positive polarity; inserting and connecting an anode wire 120 to one end of the capacitor element 110; forming a cathode extraction layer 130 on the capacitor element 110; forming a plurality of conductive bumps 140 on the cathode extraction layer 130; fixing the capacitor element 110 to a support frame 150; forming a molding portion 160 so as to surround the capacitor element 110; exposing a projecting end of the anode wire 120 and ends of the conductive bumps 140; and forming an anode lead terminal 170 which is electrically connected to the exposed end of the anode wire 120 and a cathode lead terminal 180 which is electrically connected to the exposed ends of the conductive bumps 140.

More specifically, as shown in FIG. 4, the anode wire 120 is inserted and connected to one side of the capacitor element 110 with a positive polarity, and the cathode extraction layer 130 is formed on the capacitor element 110.

The cathode extraction layer 130 is composed of a dielectric oxide coating film, a solid-state electrolyte layer, and a cathode reinforcing layer, which are sequentially formed on the capacitor element 110, and has a negative polarity.

In this case, it is preferable that the cathode extraction layer 130 is formed on the surface of the capacitor element 110 excluding the surface where the anode wire 120 is formed, in order to prevent the anode wire 120 and the cathode extraction layer 130 from being electrically connected to each other.

Alternately, the projecting surface of the anode wire 120 may be insulated from the cathode extraction layer 130 by insulation coating or the like.

Meanwhile, after the anode wire 120 is inserted and connected to the capacitor element 110, the projecting end of the anode wire 120 can be cut so as to be adjacent to the surface of the capacitor element 110, in order for the miniaturization of the solid electrolytic capacitor or an increase in capacitance.

The projecting end of the anode wire 120 may be cut by ultraviolet (UV) laser.

At this time, before the projecting end of the anode wire 120 is cut, it is preferable to coat the surface of the anode wire 120 with an insulating material.

The coating is performed to prevent LC defects which may occur in the cutting of the anode wire 120.

Next, as shown in FIG. 5, the conductive bumps 140 are formed on the surface of the cathode extraction layer 130, which is opposed to the anode wire 120.

The conductive bumps 140 are formed of metal selected from Ag, Cu, Zn, and Sn, and may be provided in the form of dots dispensed on the surface of the cathode extraction layer 130.

Alternately, the conductive bumps 140 may be formed of ink or paste including metal selected from Ag, Cu, Zn, and Sn and may be provided on the surface of the cathode extraction layer 130 through an inkjet method.

Preferably, the conductive bumps 140 are formed to have a diameter of 10 to 500 μm. More preferably, the conductive bumps 140 are formed to have a diameter of 50 to 200 μm.

Next, as shown in FIG. 6, an adhesive 155 is formed on the top surface of the support frame 150.

Then, as shown in FIG. 7, the capacitor element 110 is bonded to the support frame 150 through the adhesive 155.

At this time, a pressing force for bonding the capacitor element 110 to the support frame 150 is applied in such a manner that the adhesive 155 has a thickness of 10 to 70 μm.

Further, if necessary, while heat is applied to the adhesive 155, the adhesive 155 is semi-cured to accurately adjust the position of the capacitor element 110. Then, the semi-cured adhesive 155 is completely cured in a sealed oven or through a reflow curing process such that the capacitor element 110 can be fixed to the support frame 150.

At this time, when the adhesive 155 is an insulating adhesive, it is preferable that the curing is performed at a temperature of 150 to 170° C. for 40 to 60 minutes.

Meanwhile, the forming of the conductive bumps 140 on the cathode extraction layer 130 may be performed after the capacitor element 110 is fixed to the support frame 150.

Next, as shown in FIG. 8, the molding portion 160 is formed to seal the projecting end of the anode wire 120 and the conductive bumps 140.

The molding portion 160 may be formed of epoxy-based resin.

Preferably, the molding portion 160 is cured at a temperature of about 170° C. If necessary, a post curing process may be added, in which the molding portion 160 is cured at a temperature of 160° C. for 30 to 60 minutes.

Then, as shown in FIG. 9, the molding portion 160 is diced in such a manner that the projecting end of the anode wire 120 and the ends of the conductive bumps 140 are exposed.

At this time, it is preferable that the diced portion of the molding portion 160 is subjected to grinding, polishing, and sand blasting so as to remove foreign matters.

Finally, as shown in FIG. 10, the anode lead terminal 170 which is electrically connected to the exposed end of the anode wire 110 is formed, and the cathode lead terminal 180 which is electrically connected to the exposed ends of the conductive bumps 140 is formed.

The anode lead terminal 170 may be constructed by forming a plated layer on the exposed end of the anode wire 120 and the surface of the molding portion 160 adjacent to the exposed end, through an electroless plating method.

Preferably, the plated layer is composed of an inner plated layer formed through electroless Ni/P plating and an outer plated layer obtained by plating the inner plated layer with Cu or Sn.

Preferably, the inner plated layer is formed to have a thickness of 0.1 to 20 μm. More specifically, the inner plated layer is formed to have a thickness of 0.3 to 3 μm.

Preferably, the outer plated layer is formed to have a thickness of 0.1 to 10 μm.

Further, the cathode lead terminal 180 may be constructed by forming a plated layer on the exposed ends of the conductive bumps 140 and the surface of the molding portion 160 adjacent to the exposed ends, through an electroless plating method.

Similar to the anode lead terminal 170, the plated layer may be composed of an inner plated layer and an outer plated layer.

Meanwhile, the anode lead terminal 170 and the cathode lead terminal 180 may be formed to extend to both sides of the bottom surface of the support frame 150, respectively.

Therefore, to prevent the anode lead terminal 170 and the cathode extraction layer 130 from being electrically connected through the support frame 150, the support frame 150 may be formed of an insulating material or the adhesive 155 for bonding the capacitor element 110 to the support frame 150 may be formed of an insulating adhesive.

FIG. 11 is a cross-sectional view of a solid electrolytic capacitor according to a modification of the first embodiment. As shown in FIG. 11, the anode lead terminal 170 and the cathode lead terminal 180 are not formed in a U shape, but may be formed in an L shape.

Second Embodiment of Solid Electrolytic Capacitor

Referring to FIGS. 12 and 13, a solid electrolytic capacitor according to a second embodiment of the invention will be described in detail.

FIG. 12 is a front cross-sectional view of a solid electrolytic capacitor according to the second embodiment of the invention.

As shown in FIG. 12, the solid electrolytic capacitor 200 according to the second embodiment of the invention includes a capacitor element 210, an anode wire 220, a cathode extraction layer 230, a plurality of conductive bumps 240, a support frame 250, a molding portion 260, an anode lead terminal 270, and a cathode lead terminal 280, similar to the first embodiment.

However, the support frame 250 of the solid electrolytic capacitor 200 according to the second embodiment is formed to have a smaller size than the support frame 150 (refer to FIG. 3) of the solid electrolytic capacitor 100 according to the first embodiment. Further, the support frame 250 is bonded to the capacitor element 210 through an adhesive 255 and is not connected to the anode lead terminal 270 and the cathode lead terminal 280.

In the solid electrolytic capacitor 100 (refer to FIG. 3) according to the first embodiment of the invention, the anode lead terminal 170 and the cathode lead terminal 180 are formed to extend to both sides of the bottom surface of the support frame 150, respectively. However, in the solid electrolytic capacitor 200 according to the second embodiment, the support frame 250 simply supports the capacitor element 210 in a space between the anode lead terminal 270 and the cathode lead terminal 280.

Therefore, the support frame 250 may be formed of a conductive material, in addition to an insulating material. Further, the adhesive 255 for bonding the capacitor element 210 to the support frame 250 may be also formed of a conductive adhesive, in addition to an insulating adhesive.

FIG. 13 is a cross-sectional view of a solid electrolytic capacitor according to a modification of the second embodiment. As shown in FIG. 13, the anode lead terminal 270 and the cathode lead terminal 280 are not formed in a U shape, but may be formed in an L shape.

Third Embodiment of Solid Electrolytic Capacitor

Referring to FIGS. 14 and 15, a solid electrolytic capacitor according to a third embodiment of the invention will be described in detail.

FIG. 14 is a front cross-sectional view of a solid electrolytic capacitor according to the third embodiment of the invention.

As shown in FIG. 14, the solid electrolytic capacitor 300 according to the third embodiment of the invention includes a capacitor element 310, an anode wire 320, a cathode extraction layer 330, a plurality of conductive bumps 340, a pair of support frames 351 and 352, a molding portion 360, an anode lead terminal 370, and a cathode lead terminal 380, similar to the first embodiment.

Different from the support frame 150 of the solid electrolytic capacitor 100 (refer to FIG. 3) according to the first embodiment, the support frames 351 and 352 of the solid electrolytic capacitor 300 according to the third embodiment are bonded to both sides under the capacitor element 310 through adhesives 353 and 354 so as to be separated from each other.

Preferably, the anode-side support frame 351 from which the anode lead terminal 370 is formed to extend is bonded through an insulating adhesive, in order for the insulation from the cathode extraction layer 330.

Further, the cathode-side support frame 352 from which the cathode lead terminal 380 is formed to extend may be bonded through an insulating adhesive or conductive adhesive, because the insulation from the cathode extraction layer 330 is not necessary.

FIG. 15 is a cross-sectional view of a solid electrolytic capacitor according to a modification of the third embodiment. As shown in FIG. 15, the anode lead terminal 370 and the cathode lead terminal 380 are not formed in a U shape, but may be formed in an L shape.

According to the present invention, the structure of the solid electrolytic capacitor and the manufacturing process thereof can be simplified to reduce a manufacturing cost. Further, the solid electrolytic capacitor can be reduced in size, and the capacitance can be maximized. Furthermore, a low ESR characteristic can be implemented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A solid electrolytic capacitor comprising:
    a capacitor element with a positive polarity;
    an anode wire of which one end is inserted into the capacitor element and the other end projects outward from the capacitor element;
    a cathode extraction layer formed on the capacitor element;
    a plurality of conductive bumps formed on the cathode extraction layer;
    a molding portion formed to surround the capacitor element and exposing the projecting end of the anode wire and ends of the conductive bumps;
    an anode lead terminal provided on the molding portion so as to be electrically connected to the exposed end of the anode wire; and
    a cathode lead terminal provided on the molding portion so as to be electrically connected to the exposed ends of the conductive bumps.

2. The solid electrolytic capacitor according to claim 1 further comprising:
    a support frame provided under the capacitor element and supporting the capacitor element.

3. The solid electrolytic capacitor according to claim 2, wherein the support frame is bonded under the capacitor element through an adhesive.

4. The solid electrolytic capacitor according to claim 1, wherein the cathode extraction layer is composed of a dielectric oxide coating film, a solid-state electrolyte layer, and a cathode reinforcing layer, which are sequentially formed on the capacitor element.

5. The solid electrolytic capacitor according to claim 1, wherein the conductive bumps are formed of metal selected from silver (Ag), copper (Cu), zinc (Zn), and tin (Sn), and are provided in the form of dots dispensed on the surface of the cathode extraction layer.

6. The solid electrolytic capacitor according to claim 1, wherein the conductive bumps are formed of ink or paste including metal selected from Ag, Cu, Zn, and Sn, and are provided on the surface of the cathode extraction layer through an inkjet method.

7. The solid electrolytic capacitor according to claim 1, wherein the anode lead terminal and the cathode lead terminal are formed of a plated layer obtained by an electroless plating method.

8. The solid electrolytic capacitor according to claim 7, wherein the plated layer is composed of an inner plated layer obtained through electroless Ni/P plating and an outer plated layer obtained by plating the inner plated layer with Cu or Sn.

9. A method of manufacturing a solid electrolytic capacitor, the method comprising the steps of:
    (a) forming a capacitor element with a positive polarity;
    (b) inserting and connecting an anode wire to one side of the capacitor element;
    (c) forming a cathode extraction layer on the capacitor element;
    (d) forming a plurality of conductive bumps on the cathode extraction layer;
    (e) fixing the capacitor element to a support frame;
    (f) forming a molding portion to surround the capacitor element;
    (g) exposing a projecting end of the anode wire and ends of the conductive bumps; and
    (h) forming an anode lead terminal which is electrically connected to the exposed end of the anode wire and a cathode lead terminal which is electrically connected to the exposed ends of the conductive bumps.

10. The method according to claim 9, wherein in step (c), the cathode extraction layer is constructed by sequentially forming a dielectric oxide coating film, a solid-state electrolyte layer, and a cathode reinforcing layer on the capacitor element.

11. The method according to claim 9, wherein step (d) is performed after step (e).

12. The method according to claim 9, wherein in step (d), the conductive bumps are formed of metal selected from Ag, Cu, Zn, and Sn, and are provided in the form of dots dispensed on the surface of the cathode extraction layer.

13. The method according to claim 9, wherein in step (d), the conductive bumps are formed of ink or paste including metal selected from Ag, Cu, Zn, and Sn, and are provided on the surface of the cathode extraction layer through an inkjet method.

14. The method according to claim 9 further comprising the step of:
    cutting the projecting end of the anode wire such that the projecting end of the anode wire is adjacent to the surface of the capacitor element,
    wherein the cutting of the projecting end is performed after step (b).

15. The method according to claim 14 further comprising the step of:
    coating the surface of the anode wire with an insulating material,
    wherein the coating of the surface is performed before the cutting of the projecting end.

16. The method according to claim 14, wherein the projecting end of the anode wire is cut by ultraviolet (UV) laser.

17. The method according to claim 9, wherein in step (e), the capacitor element is fixed to the support frame through an adhesive.

18. The method according to claim 9, wherein in step (f), the molding portion is formed to seal the projecting end of the anode wire and the conductive bumps.

19. The method according to claim 18, wherein the molding portion is formed of epoxy-based resin.

20. The method according to claim 9, wherein in step (g), the molding portion is diced in such a manner that the projecting end of the anode wire and the ends of the conductive bumps are exposed.

21. The method according to claim 20, wherein the diced portion is subjected to grinding, polishing, or sand blasting.

22. The method according to claim 9, wherein in step (h), the anode lead terminal and the cathode lead terminal are plated layers formed by an electroless plating method.

23. The method according to claim 22, wherein the plated layer is composed of an inner plated layer obtained through electroless Ni/P plating and an outer plated layer obtained by plating the inner plated layer with Cu or Sn.

* * * * *